(12) United States Patent
Damlencourt et al.

(10) Patent No.: US 10,622,640 B2
(45) Date of Patent: Apr. 14, 2020

(54) CURRENT COLLECTOR WITH INTEGRATED LEAK-PROOFING MEANS, BIPOLAR BATTERY COMPRISING SUCH A COLLECTOR

(71) Applicant: COMMISSARIAT A L'ENERGIE ATOMIQUE ET AUX ENERGIES ALTERNATIVES, Paris (FR)

(72) Inventors: Jean-Francois Damlencourt, Laval (FR); Marianne Chami, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 20 days.

(21) Appl. No.: 14/412,588

(22) PCT Filed: Jul. 1, 2013

(86) PCT No.: PCT/IB2013/055394
§ 371 (c)(1),
(2) Date: Jan. 2, 2015

(87) PCT Pub. No.: WO2014/006557
PCT Pub. Date: Jan. 9, 2014

(65) Prior Publication Data
US 2015/0155564 A1     Jun. 4, 2015

(30) Foreign Application Priority Data
Jul. 3, 2012 (FR) ...................... 12 56373

(51) Int. Cl.
*H01M 4/66* (2006.01)
*H01M 10/04* (2006.01)
(Continued)

(52) U.S. Cl.
CPC ....... *H01M 4/667* (2013.01); *H01M 10/0468* (2013.01); *H01M 10/0525* (2013.01);
(Continued)

(58) Field of Classification Search
CPC ........ H01M 2/26; H01M 4/667; H01M 4/668; H01M 4/742; H01M 10/0525;
(Continued)

(56) References Cited

U.S. PATENT DOCUMENTS

| 5,750,289 A | 5/1998 | Kejha |
| 7,097,937 B2 | 8/2006 | Fredriksson et al. |

(Continued)

FOREIGN PATENT DOCUMENTS

| EP | 1596459 | 11/2005 |
| EP | 2073300 | 6/2009 |

(Continued)

*Primary Examiner* — Matthew T Martin
(74) *Attorney, Agent, or Firm* — Norton Rose Fulbright US LLP (57) ABSTRACT

The present patent application relates to a device for a lithium electrochemical generator, said device comprising a band (100) of electrical insulating material including at least one polymer, and at least one metallic layer (102) which forms a current collector and is deposited on at least one of the two main faces in the central part of the band. The central part (100C) of the band comprises a plurality of holes (101) emerging on its two opposite main faces, said holes being filled at least partially with a metal that is continuous with each deposited metallic layer. The periphery of the band (100P) is devoid of metallic layer and at least one metallic layer is covered with an electrode of lithium insertion material.

11 Claims, 5 Drawing Sheets

(51) Int. Cl.
*H01M 10/0525* (2010.01)
*H01M 10/0585* (2010.01)
*H01M 2/26* (2006.01)
*H01M 4/74* (2006.01)

(52) U.S. Cl.
CPC .......... *H01M 10/0585* (2013.01); *H01M 2/26* (2013.01); *H01M 4/668* (2013.01); *H01M 4/742* (2013.01); *H01M 10/044* (2013.01); *H01M 10/0418* (2013.01); *Y10T 29/49115* (2015.01)

(58) Field of Classification Search
CPC ......... H01M 10/0585; H01M 10/0468; H01M 10/044; H01M 10/0418
USPC .................................................. 429/234, 246
See application file for complete search history.

(56) References Cited

U.S. PATENT DOCUMENTS

| | | | |
|---|---|---|---|
| 7,163,765 B2 | 1/2007 | Hosaka et al. | |
| 7,220,516 B2 | 5/2007 | Oosawa et al. | |
| 7,279,248 B2 | 10/2007 | Fukuzawa et al. | |
| 7,320,846 B2 | 1/2008 | Watanabe et al. | |
| 7,335,448 B2 | 2/2008 | Kaito et al. | |
| 7,338,733 B2 | 3/2008 | Hideyo et al. | |
| 7,348,098 B2 | 3/2008 | Hayaski et al. | |
| 2006/0105243 A1* | 5/2006 | Okamura | H01M 4/64 429/234 |
| 2006/0121348 A1 | 6/2006 | Mizutani et al. | |
| 2008/0057392 A1 | 3/2008 | Takamatsu et al. | |
| 2008/0060189 A1 | 3/2008 | Daidoji et al. | |
| 2013/0089774 A1* | 4/2013 | Chami | H01M 2/26 429/158 |

FOREIGN PATENT DOCUMENTS

| | | |
|---|---|---|
| FR | 2961637 | 12/2011 |
| JP | 2010153224 | 7/2010 |
| WO | WO2003/047021 | 6/2003 |
| WO | WO2006/061696 | 6/2006 |
| WO | WO2011/157751 | 12/2011 |
| WO | WO2012/170789 | 12/2012 |

* cited by examiner

CURRENT COLLECTOR WITH INTEGRATED LEAK-PROOFING MEANS, BIPOLAR BATTERY COMPRISING SUCH A COLLECTOR

CROSS-REFERENCE TO RELATED APPLICATIONS

This application is a national phase application under 35 U.S.C. § 371 of International Application No. PCT/IB2013/055394 filed 1 Jul. 2013, which claims priority to French Patent Application No. 1256373 filed 3 Jul. 2012. The entire contents of each of the above-referenced disclosures is specifically incorporated herein by reference without disclaimer.

TECHNICAL FIELD

The present invention relates to the field of lithium electrochemical generators that function according to the principle of insertion or deinsertion, or in other words intercalation/deintercalation, of lithium into at least one electrode.

It more particularly relates to lithium electrochemical accumulators comprising at least one bipolar-function current collector, also referred to as bipolar batteries. In such bipolar batteries, the bipolar collector bears on each of its opposite faces one of the two electrode materials of opposite sign, i.e. a cathode (positive electrode) is borne by one of the faces and an anode (negative electrode) is borne by the other of the opposite faces.

The invention aims to improve the leak-tightness of electrochemical generators with respect to the electrolyte, and in particular to improve the leak-tightness of a bipolar battery with respect to the electrolyte in liquid form.

PRIOR ART

The architecture of conventional lithium-ion batteries is an architecture that may be qualified "monopolar", as based on a single electrochemical cell comprising an anode, a cathode and an electrolyte. A number of types of monopolar architecture geometry are known:
  a cylindrical geometry such as disclosed in patent application US 2006/0121348;
  a prismatic geometry such as disclosed in U.S. Pat. Nos. 7,348,098 and 7,338,733; and
  a stack geometry such as disclosed in patent applications US 2008/060189, US 2008/0057392, and U.S. Pat. No. 7,335,448.

A monopolar architecture is produced by winding. The winding consists of a current collector on which a positive electrode (cathode) material is continuously deposited, a separator made of a polymeric or ceramic material forming an interlayer between this and a negative electrode (anode) material itself deposited on another current collector. The main advantage of this monopolar architecture is that it has a large active area of material but the potential difference is limited to the unit value of the potential difference between the two electrode materials used, this also being the case for the stack geometry.

In order to increase the average potential of a monopolar Li-ion accumulator while preserving a comparable energy density, it is known to produce a battery containing a plurality of electrochemical cells in series. The architecture of the battery is thus qualified as "bipolar" because it comprises a cathode of a cell and an anode of an adjacent cell which are borne by the same current collector, which takes the form of plate that itself is qualified as a "bipolar electrode". Thus, the architecture of a bipolar battery corresponds to a plurality of monopolar accumulators placed in series by way of bipolar electrodes or current collectors, such an architecture however having the advantage of a lower electrical resistance relative to monopolar accumulators connected in series by exterior connectors. Mention may be made here of many patents or patent applications relating to such bipolar batteries, such as U.S. Pat. Nos. 7,279,248, 7,220,516, 7,320,846, 7,163,765, WO 03/047021, WO 2006/061696 and U.S. Pat. No. 7,097,937.

For a bipolar battery, the resulting advantages are a lower weight and the avoidance of unnecessary bulk.

The main difficulty in designing a bipolar battery is how to produce compartments that are perfectly tight against leakage of the electrolyte, which in general is a liquid, from one compartment to another. Specifically, a poor leak-tightness leads to ionic short-circuits causing the bipolar battery to malfunction.

This is moreover corroborated by the fact that most of the patent literature relating to the field of bipolar Li-ion batteries relates to leak-tightness solutions, also called sealing solutions or seals, for preventing the leakage of electrolyte from one compartment to another (ionic short-circuits). Whatever the sealing system used, it must:
  be chemically resistant to the liquid electrolyte, for example consisting of a solution of $LiPF_6$ lithium salt in an ethylene carbonate (EC)/dimethyl carbonate (DMC) solvent mixture;
  be easy to form: specifically, regarding the stacking operations of the various constituent elements of a bipolar battery, the formation of the seal must be compatible with an industrial manufacturing line and be carried out at relatively low temperatures generating no or almost no degradation of the electrodes, the separator or the electrolyte; and
  ensure a complete seal over the long term.

Among the patent applications or patents already cited above, mention may be made of U.S. Pat. No. 7,220,516, which describes a solution with a flexible adhesive film 5, 6 adhesively bonded to the periphery of the bipolar collector.

Mention may also be made of U.S. Pat. No. 7,320,846, which describes a solution in which collectors 4 and electrolytes 6 are encapsulated in a resin 10.

Mention may also be made of U.S. Pat. No. 7,163,765, which describes a sealing solution with hybrid polyamide/PP spacers 9 arranged between bipolar collectors, the polyamide being welded directly to the periphery of the collectors at distance from the cells).

U.S. Pat. No. 7,097,937 for its part provides a double-sealing solution since an interior barrier 14, 22 made of a fluoropolymer is arranged on the periphery of the bipolar collector 11, and an exterior frame 18, 23 made of an elastomer is arranged outside the barrier 14, 22 on and around the bipolar collector, an additional ring 15 made of an elastomer optionally being arranged on the collector 11.

Mention may also be made of patent application EP 2073300 in the name of the Applicant, which provides a solution in which the dimensions of the plates are increased one relative to an adjacent other and the seals interposed between the interconnecting plates are transversely shifted so that two seals are not located in line with each other along the stacking axis of the cells.

Mention may also be made of patent application JP 2010153224, which describes producing a bipolar battery with each bipolar current collector 1 formed from a polymer filled with particles of a conductive material, the leak-tightness being obtained by a bead 31 of resin on the periphery of and on each face of the bipolar collector 1. A bipolar battery according to the teachings of this application cannot practically be envisioned for an application in which it is sought to use the battery to deliver a high power. In particular, the envisioned bipolar current collector 1 has a low electronic conductivity and a high electrical resistance.

Mention may lastly be made of patent application WO 2011/157751, which describes a solution for integrating polymer-based sealing means into a metal sheet or grid having a current collector function.

Thus, the solutions envisioned in the prior art for improving how tight compartments are against leakage of the electrolyte from one compartment to another in a Li-ion bipolar battery may be summarized in the following way:

systematically producing the bipolar current collector, also called the bipolar electrode, in the form of a plate or of a polymer filled with particles of a conductive material;

using various resins or adhesives on the periphery of the plate or of the polymer filled with particles of a conductive material;

increasing the format of the bipolar current collector plate in order to create an additional barrier to the electrolyte; and integrating polymer-based sealing means into a metal sheet or grid having a current collector function.

None of the sealing solutions envisioned in the prior art are entirely satisfactory. In particular, although the solution of patent application WO 2011/157751 is entirely satisfactory as regards the actual leak-tightness and the weight saving achieved for the final bipolar battery, it could be further improved, especially in order to increase electronic conductivity between the two electrode materials on either side of a bipolar current collector and to decrease the internal electrical resistances of the latter.

Patent application EP 1 596 459 discloses a Li-ion battery comprising a plurality of electrochemical cells that are electrically connected in parallel, in which battery each current collector is a biface electrode of the same polarity formed from a polymer band bearing, on its two main faces, a metal layer, itself coated with an anode or cathode layer. The two main faces of the peripheral zone of each current collector, opposite the zone ensuring the electrical insulation, are necessarily covered with the metal layer in order to ensure the electrical connection with a conductive film serving as a terminal collector, said film being placed on the lateral edges of the cells. In any case, it is not possible to apply this architecture to a bipolar battery because in such batteries the lateral edges are those used to produce the walls that seal against leakage of the electrolyte, these walls not being electrically conductive.

The general aim of the invention is to provide another solution to those envisioned in the prior art for improving how tight compartments are against leakage of the electrolyte (in particular the liquid electrolyte) from one compartment to another in a Li-ion bipolar battery and more generally in a lithium electrochemical generator.

A particular aim is to provide a solution for making a bipolar battery, and more generally a lithium electrochemical generator, tight against leakage of the electrolyte, more particularly a liquid electrolyte, which increases the electronic conductivity of the bipolar collectors forming it and that decreases their internal electrical resistances.

SUMMARY OF THE INVENTION

To do this, one subject of the invention is a device for lithium electrochemical generators, comprising a band made of an electrically insulating material comprising at least one polymer and at least one metal layer forming a current collector, said metal layer being deposited on at least one of the two main faces in the central portion of the band, the central portion of the band comprising a plurality of holes opening onto its two opposite main faces, the holes being filled at least partially with a metal that is continuous with each deposited metal layer, the periphery of the band being devoid of metal layer and at least one metal layer being covered with an electrode made of a lithium insertion material.

The expression "the periphery of the band being devoid of metal layer" is understood to mean that the entire periphery of the main faces has no metal material and that it forms part of the leak-tight wall preventing leakage of the electrolytes in the electrochemical generator.

A device according to the invention may just as easily form a bipolar collector as a terminal collector. In the latter case, the connection to the terminal electrodes may be achieved by means of a metal paste, typically made of aluminum, or any sort of metal collector made of aluminum or copper.

When a metal paste is deposited on each face, the holes fill with paste and the electrical contact is achieved by adhesion of the pastes of each face thus ensuring electrical conduction.

Thus, according to the invention, just like in patent application WO 2011/157751, the sealing means are so to speak integrated into a part the function of which is to be a current collector.

In other words, a novel battery semi-product of sorts is defined integrating at the same time:

the current collector that, when it is bipolar, conducts electricity between the cathode of one cell and the anode of an adjacent electrochemical cell, i.e. that stacked immediately above or below; and a peripheral zone made exclusively of the electrically insulating material that, once assembled, participates in preventing the electrolytes of the battery from leaking. It goes without saying that in the context of the invention, those skilled in the art will take care to define one or more insulating materials (polymers) that do not creep in the temperature ranges of operation of a bipolar battery.

According to the invention, relative to a device according to patent application WO2011/157751 or JP 2010153224, because of the presence of holes filled with conductive metal, the device according to the invention has an increased electronic conductivity and a lower internal electrical resistance.

A device according to the invention may have a thickness between 10 and 100 μm and preferably between 25 and 50 μm.

Typically, the metal that is continuous is aluminum or an alloy based on aluminum.

The expression "metal that is continuous" is understood to mean that the metal blocks the hole so as to guarantee a leak-tight seal. Nevertheless, the hole may not be filled in its entirety.

A device according to the invention may have any geometry, such as a section of polygonal shape, for example a rectangle or a square, with a zone devoid of metal layers as defined above arranged on the periphery.

It is possible to envision a planar length dimension between 40 and 70 cm, typically of about 50 cm, and a planar width dimension between 10 and 25 cm and typically of about 15 cm. The peripheral zone devoid of metal layer according to the invention may advantageously form a frame of width between 1 mm and 10 cm, more particularly between 3 mm and 12 mm and typically of about 5 mm. Thus, the peripheral zone devoid of metal layer according to the invention may have an area that represents less than 25% of the total area of the device, preferably less than 20% and even more preferably less than 15%.

The device according to the invention therefore makes it simpler to actually obtain a leak-tight seal and to achieve a substantial weight saving (the plate used by way of collector being avoided) and, thus, a substantial improvement in performance. Specifically, for a given weight, the energy density of a battery according to the invention is increased and therefore the performance of said battery is improved. Furthermore, since the leak-tightness of the battery is improved, the battery is upgraded. Lastly, since the electrical conductivity is higher and the internal resistance of the device according to the invention is lower, it may be envisioned to use bipolar batteries integrating devices according to the invention in high-power applications.

According to one variant, the polymer that is the majority constituent of the band is a polyolefin. The polymer that is the majority constituent of the band may thus be chosen from polyethylene (PE) or polypropylene (PP). Polymers that are already tried-and-tested constituents of flexible Li-ion battery packaging, such as the packaging sold by Showa Denko under the trade reference No ADR-ON25/AL40/CPP40 or No ADR-ON25/AL40/CPP80, may thus be chosen.

The band may comprise at least one other polymer, said other polymer being interposed between the polyolefin and the current collector in order to improve their adhesion to each other. The other polymer may be chosen from a polyester or a polyurethane. The band may also comprise at least one other polymer in order to improve the properties, such as flexibility and lightness, of the peripheral zone having a sealing function.

According to an alternative variant, the polymer that is the majority constituent of the band may be a two-component resin and preferably an acrylic resin. Specifically, acrylic resin has an excellent mechanical withstand to contact with carbonated electrolytes.

The holes according to the invention may be of cylindrical section or frustoconical section.

Advantageously, the diameter of the holes is between 50 and 500 μm and preferably between 50 and 200 μm.

The density of the holes being equal to a number between 0.1 and 1/cm$^2$ of band and preferably between 0.1 and 0.3/cm$^2$ of band.

The number of holes and their dimensions per polymer band is chosen depending on the dimensions of said band and on possible electrical properties. Specifically, the internal electrical resistance and electrical heating (dissipation via the Joule effect) of a device according to the invention depends on the number of holes and their dimensions.

As regards producing the holes in a polymer band, it may be envisioned to use any means capable of producing matrices of holes of small size in a polymer film. A tool with heated irons may for example be used which, by movement of the tool transversely to the plane of the film, each cause the polymer to melt locally thus defining a calibrated hole. It is also possible to envision using a laser that will locally melt the polymer. Such a laser may thus be mounted on a suitable holder and be programmed to produce matrices of holes. The holder may be a head that is piezoelectrically actuated so as to allow the laser to be moved with precision in directions transverse to the band. One advantage of using a laser rather than a tool with heated irons is that the dimensions of the holes may be easily modified.

Depending on the type of lithium insertion electrode materials chosen, the current collector formed by a metal layer may be made of aluminum or metalized on the surface of another metal, for example made of aluminum superposed on copper.

When the current collector of the device is intended to be bipolar, the two metal layers on either side of the band are each covered with an electrode made of a lithium insertion material.

The expression "electrode made of a lithium insertion material" is here and in the context of the invention understood to mean an electrode comprising at least one lithium insertion material and at least one polymer binder. Optionally, the electrode may in addition comprise an electronic conductor, for example carbon fibers or carbon black.

The expression "lithium insertion material", in particular for the positive electrode, is here and in the context of the invention understood to mean a material chosen from spinal lithiated oxides containing manganese, lamellar lithiated oxides, and mixtures thereof, and polyanionic framework lithiated oxides of formula $LiM_y(XO_z)_n$, where M represents an element chosen from Mn, Fe, Co, Ni, Cu, Mg, Zn, V, Ca, Sr, Ba, Ti, Al, Si, B and Mo and X represents an element chosen from P, Si, Ge, S and As, y, z and n being positive integers.

The expression "lithium insertion material", in particular for the negative electrode, is also understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

The expression "lithiated derivative" is here and in the context of the invention understood to mean compounds of formula $Li_{(4-x1)}M_{x1}Ti_5O_{12}$ and $Li_4Ti_{(5-y1)}N_{y1}O_{12}$, where x1 and y1 are respectively between 0 and 0.2 and M and N are respectively chemical elements chosen from Na, K, Mg, Nb, Al, Ni, Co, Zr, Cr, Mn, Fe, Cu, Zn, Si and Mo.

The expression "non-lithiated derivative" is here and in the context of the invention understood to mean $Ti_{(5-y1)}N_{y1}O_{12}$, where y1 is between 0 and 0.2 and N is a chemical element chosen from Na, K, Mg, Nb, Al, Ni, Co, Zr, Cr, Mn, Fe, Cu, Zn, Si and Mo.

When the current collector of the device is intended to be monopolar, a single metal layer is covered with an electrode made of a lithium insertion material.

The invention also relates to a bipolar battery comprising at least two electrochemical cells stacked on one another and at least one device as described above with the two layers forming a current collector, each covered with an electrode, in which one of the layers of the current collector is covered with the anode made of a lithium insertion material of one of the two cells, and the other of the two layers of the current collector is covered with the cathode made of a lithium insertion material of the other of the two cells, the periphery of the band made of at least one polymer forming a peripheral zone of a wall that is leak-tight to the electrolytes of the two cells that encircles the latter.

Such a battery furthermore advantageously comprises at least one device as described above with only one layer covered with an electrode, the other face not covered by an electrode making contact via the holes filled with metal with a terminal current collector.

Preferably, the anodes are made of $Li_4Ti_5O_{12}$ and the cathodes of $LiFePO_4$.

Lastly, the invention relates to a process for producing a bipolar battery comprising at least two electrochemical cells stacked on one another, comprising the following steps:

a/ producing are device as described above with the two faces each covered with a metal layer each covered with an electrode made of a lithium insertion material and two devices a single face of which is covered with a metal layer itself covered with an electrode made of a lithium insertion material, so that:

that one and only face of one of the two devices on which a layer forming a current collector is deposited is covered with an anode made of a lithium insertion material;

that one and only face of the other of the two devices on which a layer forming a current collector is deposited is covered with a cathode made of a lithium insertion material; and one of the two faces of the device, on which face a layer forming a current collector is deposited, is covered with a cathode made of a lithium insertion material whereas the other of the two faces of the device, on which face a layer forming a current collector is deposited, is covered with an anode made of a lithium insertion material;

b/ stacking the three devices, a separator being inserted between two adjacent devices, the stack with insert being produced so that:

the anode of one of the two devices described above faces the cathode of the device described above, said anode and said cathode being separated by a first separator;

the cathode of the other of the two devices described above faces the anode of the device described above, said cathode and said anode being separated by a second separator;

c/ applying pressure to the peripheries of the three bands of the devices forcing them together, the separators each being impregnated with an electrolyte; and d/ maintaining the three bands pressed together in order to form a wall that is leak-tight to the electrolytes of the two cells that encircles the latter.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from the polyolefins such as polypropylene, polyethylene and cellulose.

The electrolyte according to the invention may be a liquid formed by a carbonate mixture and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being a liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate $(CF_3SO_3)$, bis(trifluoromethanesulfonate)imide $[(CF_3SO_2)_2N]$ and tris(trifluoromethanesulfonate)methide $[(CF_3SO_2)_3C]$.

As regards the step of impregnating the separator with electrolyte, it may be envisioned either to do it before the stacking operation, i.e. the separator is impregnated with electrolyte when it is fitted (inserted), or once the stacking operation (step b/) has been completed.

According to one embodiment of the invention, a plurality of devices comprising an electrode on each face may be used to create n electrochemical cells in a bipolar battery according to invention, n being a positive integer. The integer n may for example be equal to 13, thereby implying the production of a number, equal to 12, of devices according to the invention, each with an electrode on each face. In other words, a bipolar battery comprising n electrochemical cells stacked individually one on top of another may be produced by carrying out the aforementioned steps a/ to d/ with (n−1) devices each with one electrode on each face and two devices, at the ends of the stack, each with a single electrode on one face.

Steps c/ and d/ may advantageously and simply be carried out according to two alternatives:

either by fitting the rigid packaging of the bipolar battery, or by heat sealing using a U-shaped clamp placed about peripheral portions of the bands made of electrically insulating material.

The deposition of at least one electrode on a metal layer forming a current collector of at least one of the devices may be carried out by a conventional printing technique such as screen printing, rotogravure printing, flexographic printing, spray printing, etc.

The deposition of each metal layer on a face is advantageously carried out by screen printing a metal paste so as to at least partially fill each hole. The paste is advantageously an aluminum paste. Of course, it may be envisioned to use a plurality of pastes of different materials, for example an aluminum paste and a copper paste, when it is desired to form a current collector comprising a plurality of materials.

DETAILED DESCRIPTION

Other advantages and features will become more clearly apparent on reading the following detailed description which is given by way of illustration and with reference to the figures, in which.

For the sake of clarity, the same references designating the same bipolar battery elements according to the prior art and according to the invention are used in all FIGS. 1 to 6.

It will be noted that various elements, in particular the layers of material and holes according to the invention, are shown merely for the sake of clarity and that they are not to scale.

Figure 8A:
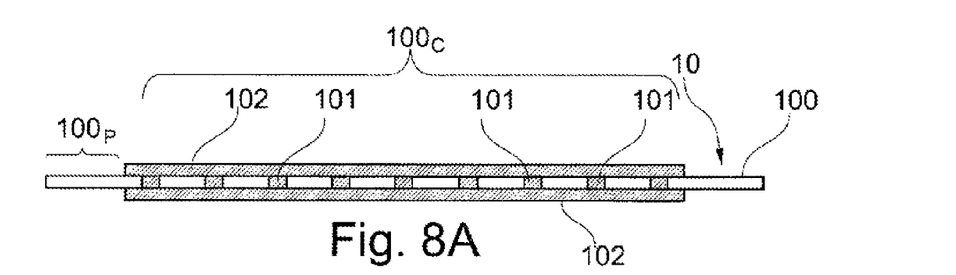
FIGS. 8A to 8D' are schematic views each of which illustrates a step of a process for producing a polar battery from three devices according to the invention, step 8D' being an alternative step to step 8D.
Figure 8B:
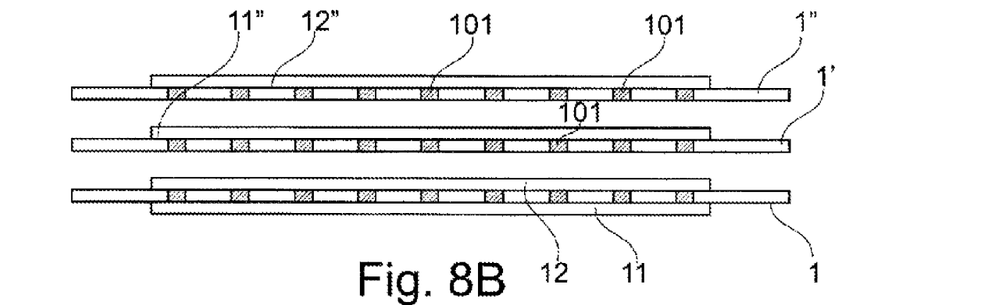
Figure 8C:
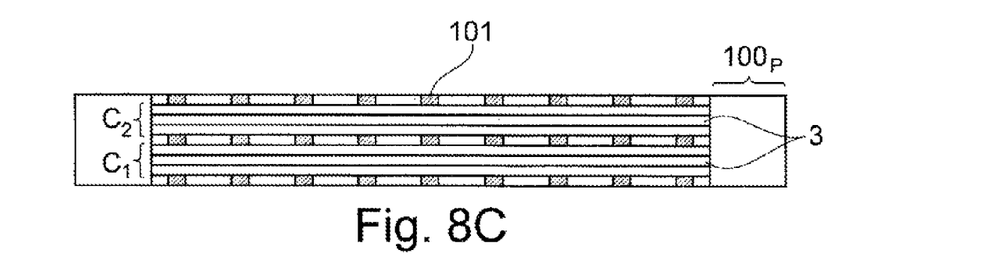
Figure 8D:
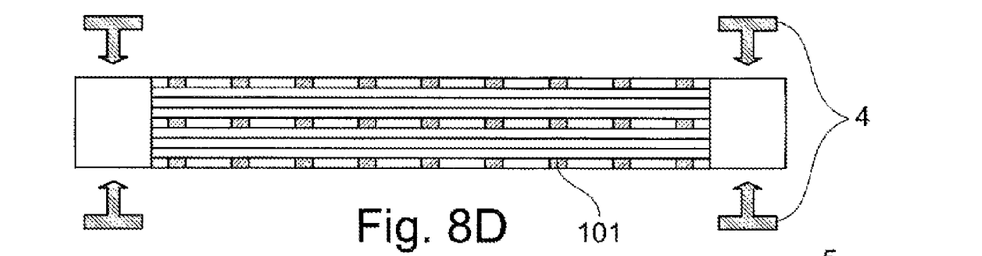

It will also be noted that the metal layers 102 forming the current collector are not shown in FIGS. 8B to 8D' for the sake of clarity.

Figure 1:
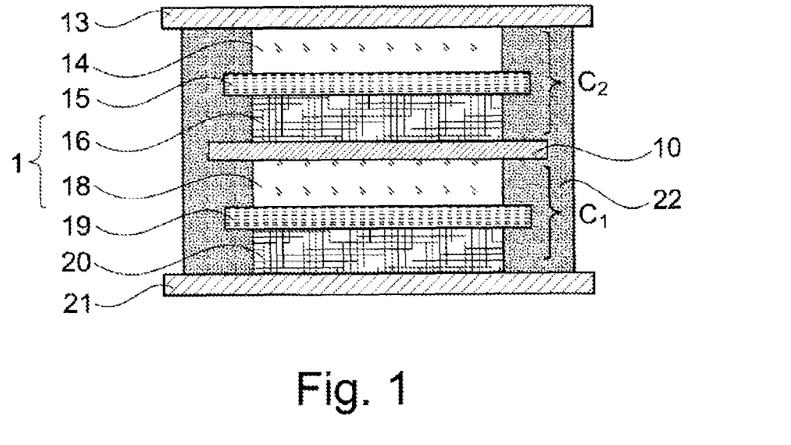
FIG. 1 is a schematic longitudinal cross-sectional view of a lithium bipolar battery according to the prior art.

FIG. 1 shows a Li-ion bipolar battery according to the prior art, such as illustrated in patent application WO 03/047021. The top portion of this battery comprises a conductive aluminum substrate 13 (positive terminal current collector) and an active layer 14 based on a positive lithium insertion material such as $Li_1O_4Mn_{1.96}O_4$, and its bottom portion a conductive aluminum substrate 21 (negative terminal current collector) and an active layer 20 based on a positive lithium insertion material, such as $Li_4Ti_5O_{12}$.

Within this battery, a bipolar electrode 1, also called a bipolar current collector, comprises an anode layer 16 and a cathode layer 18 on either side of a conductive aluminum substrate 10 taking the form of a plate. The bottom electrode 20 and top electrode 14 are separated from the bipolar electrode 1 by two separators 15, 19 in which an electrolyte is present in liquid or gel form. The battery is made tight to leakage of the electrolytes between the two completed adjacent electrochemical cells 14, 15, 16 and 18, 19, 20 by a seal 22 that is produced by depositing a resin or adhesives on the periphery of all the electrodes and the plate 10.

Figure 2A:
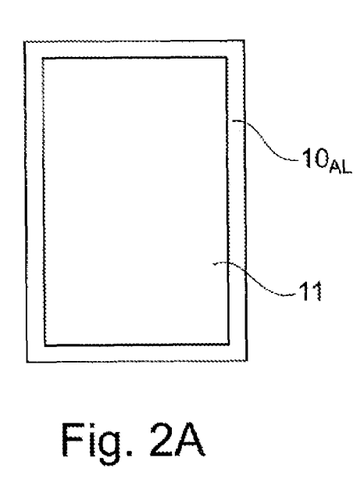
FIGS. 2A and 2B are a front view and cross-sectional view, respectively, of one bipolar current collector used in a lithium bipolar battery according to the prior art.
Figure 2B:
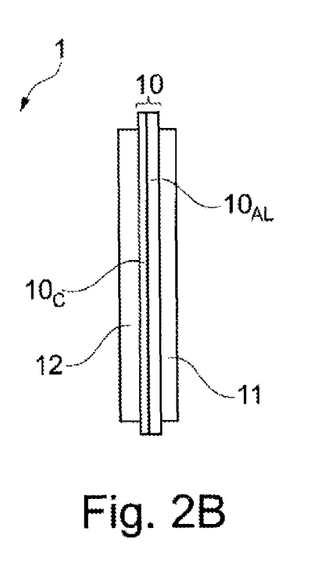
Figure 3A:
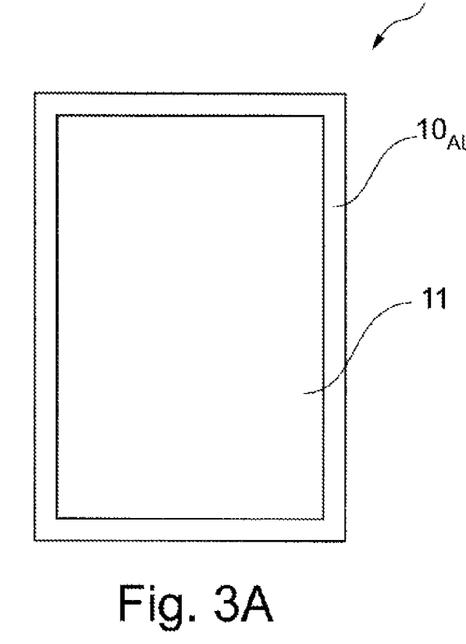
FIGS. 3A and 3B are a front view and cross-sectional view, respectively, of another bipolar current collector used in a lithium bipolar battery according to the prior art.
Figure 3B:
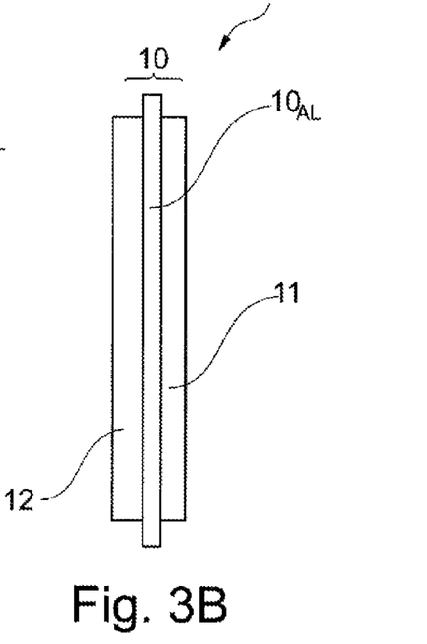

A bipolar current collector 10 according to the prior art, depending on the lithium-ion insertion materials employed to produce the electrodes:

either consists of two superposed plates, one 10A1 of which, typically made of aluminum, is covered by a cathode 11, and the other 10C of which, typically made of copper, is covered by an anode 12 (FIGS. 2A and 2B);

or consists of a single plate 10A1, typically made of aluminum, covered on one of its faces by a cathode 11 and on the other of its faces by an anode 12 (FIGS. 3A and 3B). The main difficulty encountered designing a bipolar battery according to the prior art is how to produce compartments that are perfectly tight against leakage of the electrolyte, which in general is a liquid, from one compartment to another, such as between the two cells C1 and C2, i.e. between the compartments referenced 14, 15, 16 and 18, 19, 20 in FIG. 1.

The prior art solutions of producing seals 22 or increasing the size of the plates 10 of the bipolar electrode are not entirely satisfactory.

Thus, the inventors propose a completely different current-collector design solution that allows a higher electrical conductivity and a lower internal resistance to be obtained relative to a current collector according to patent application JP 2010153224 or according to patent application WO2011/157751.

Thus, the inventors in substance propose to produce holes that open onto each of the opposite main faces of a polymer band, then to deposit on at least one of the faces a metal layer that will fill the holes. The metal filling the holes is thus continuous with the one or more layers forming the current collector for the subsequently deposited electrodes, thereby allowing a high electrical conductivity to be obtained for said collector while its internal electrical resistance remains low.

Figure 4:
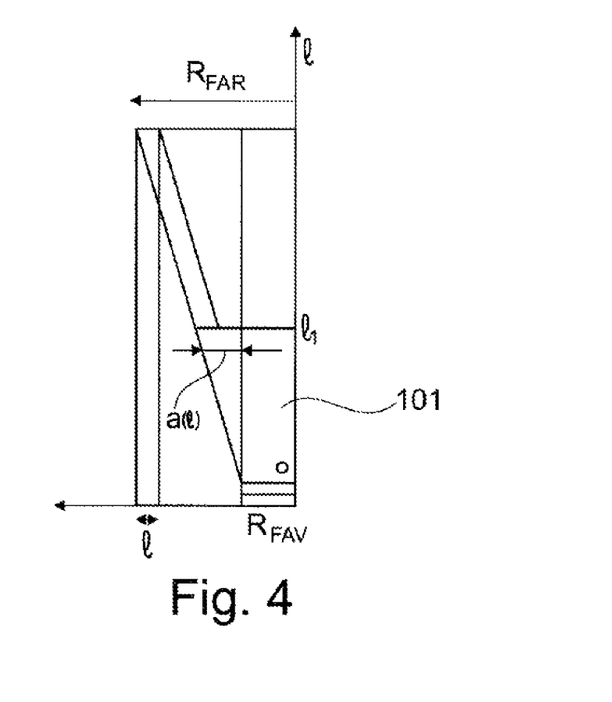
FIG. 4 is a schematic cross-sectional view of a hole in a polymer band, said hole being partially filled with a metal according to the invention.

The electrical resistance of a hole 101 of frustoconical cross section filled with a metal of given electrical conductivity ρ, as schematically shown in FIG. 4, has been calculated.

It will be noted that the hole 101 must be plugged but is not necessarily filled in its entirety.

The equation is written in the following way:

$$R_{via} = \rho \int_0^l \frac{1}{S(x)} \partial x =$$

$$\rho \left\{ \int_0^{l_1} \frac{1}{S_1(x)} \partial x + \int_{l_1}^l \frac{1}{S_2(x)} \right\}$$

in which Rvia designates the resistance of the hole, ρ designates the resistivity of the metal filling the hole, l designates the height of the hole and l1 designates the height of the metal filling the hole.

The first term of the equation is calculated as follows:

$$\int_0^{l_1} \frac{1}{S_1(x)} \partial x = \frac{1}{\pi} \int_0^{l_1} \frac{1}{r(x)^2} \partial x =$$

$$\frac{1}{\pi} \int_0^l \frac{1}{\left(\frac{(r_{FAR}-r_{FAV})}{l}x + r_{FAV}\right)^2} \partial x$$

By setting:

$$\Delta r = r_{PAR} - r_{FAV}, \frac{\Delta r}{l} = a \; et \; r_{PAV} = b$$

$$\int_0^{l_1} \frac{1}{S_1(x)} \partial x = \frac{1}{\pi} \int_0^{l_1} \frac{1}{(ax+b)^2} \partial x = \frac{1}{\pi}\left[-\frac{1}{a\cdot(ax+b)}\right]_{x=0}^{x=l_1}$$

$$\int_0^{l_1} \frac{1}{S_1(x)} \partial x = \frac{1}{\pi}\left[\left(-\frac{1}{a\cdot(al_1+b)}\right) + \left(\frac{1}{ab}\right)\right]$$

$$\int_0^{l_1} \frac{1}{S_1(x)} \partial x =$$

$$\frac{1}{\pi}\left[\frac{-b+al_1+b}{ab(al_1+b)}\right] = \frac{1}{\pi}\left[\frac{l_1}{b(al_1+b)}\right]$$

The second term of the equation is calculated as follows:

$$\int_{l_1}^l \frac{1}{S_2(x)} \partial x = \frac{1}{\pi} \int_{l_1}^l \frac{1}{r(x)^2 - r_1^2(x)} \partial x =$$

$$\frac{1}{\pi} \int_{l_1}^l \frac{1}{r^2(x) - (r(x)-e)^2} \partial x = \frac{1}{\pi} \int_{l_1}^l \frac{1}{r^2(x) - r^2(x) + 2r(x)Xe - e^2} \partial x$$

$$\int_{l_1}^l \frac{1}{S_2(x)} \partial x = \frac{1}{\pi} \int_{l_1}^l \frac{1}{2a(ax+b) - e^2} =$$

$$\frac{1}{\pi} \int_{l_1}^l \frac{1}{2eax + 2eb - e^2} = \frac{1}{\pi} \int_{l_1}^l \frac{1}{Ax+B}$$

Where: $A = 2ea$ and $B = 2eb - e^2$ $$\int_{l_1}^l \frac{1}{S_2(x)} \partial x = \frac{1}{\pi}[Ln(Ax+B)]_{l_1}^l$$

$$\int_{l_1}^l \frac{1}{S_2(x)} \partial x = \frac{1}{\pi} Ln \frac{Al+B}{Al_1+B}$$

Thus, finally, the equation is written in the following way:

$$R_{via} = \rho \left\{ \int_0^{l_1} \frac{1}{S_1(x)} \partial x + \int_{l_1}^{l} \frac{1}{S_2(x)} \partial x \right\} =$$

$$\frac{\rho}{\pi} \left\{ \left[ \frac{l_1}{b(al_1 + b)} \right] + \frac{1}{A} \operatorname{Ln} \frac{Al + B}{Al_1 + B} \right\}$$

Thus, it is easily possible to calculate the best possible dimensions for a hole in order to minimize the internal resistance induced by the metal that fills it.

Figure 5A:
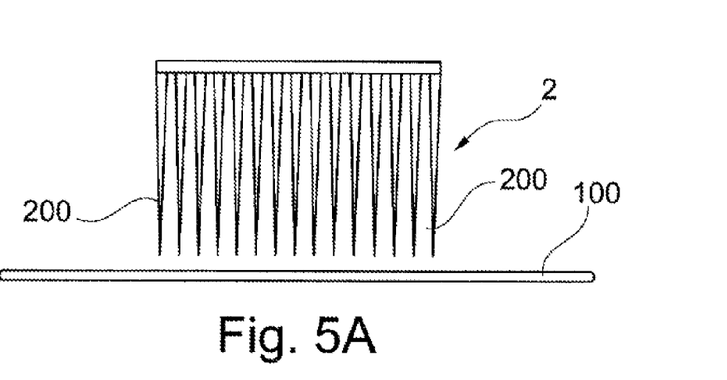
FIGS. 5A to 5C are schematic views each of which illustrates a step of a process for producing holes in a polymer band according to the invention.
Figure 5B:
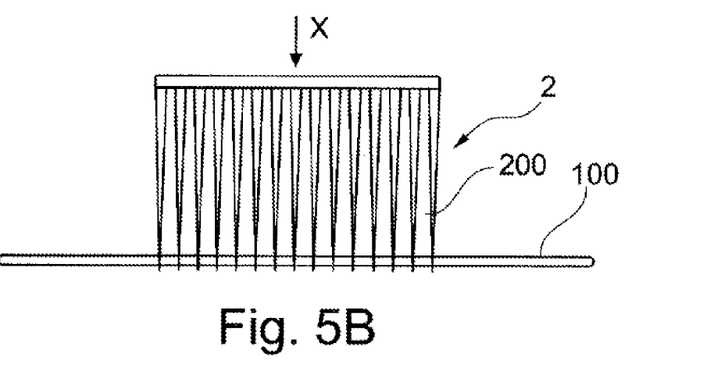
Figure 5C:
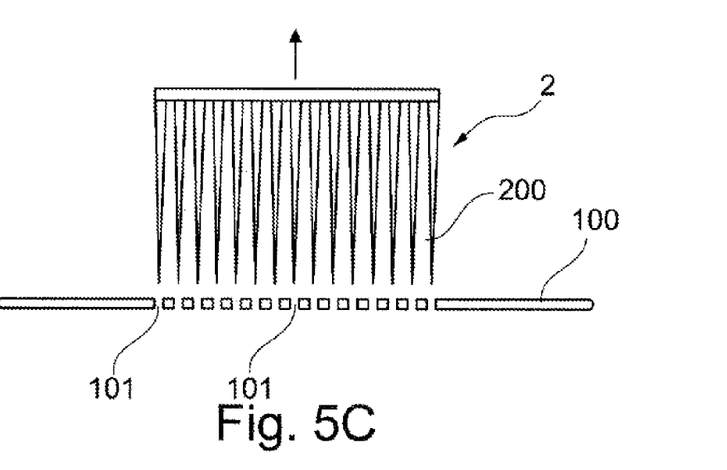

FIGS. 5A to 5C illustrate a process for producing one portion 10 of a device according to invention.

First a polymer band 100 is produced.

Next, a tool 2 with heated irons, preferably taking the form of a matrix the number of irons of which corresponds to the number of through-holes that it is desired to produce, is brought near. The tool 2 is moved in a direction X orthogonal to the plane of the polymer band (FIG. 5A).

The irons are heated here to a temperature above the melting point of the polymer that is the majority constituent of the band 100. Thus, a band made of PE, the melting point of which is between 85 and 140° C. must be pierced with irons heated to a higher temperature.

The movement occurs along a given path in order to obtain holes 101 of calibrated dimensions (FIG. 5B). In the example illustrated, the irons 200 are all identical and conical in shape and therefore allow identical holes 101 of frustoconical shape to be obtained.

Once the movement along the given path has been carried out, and therefore the holes 101 of calibrated dimensions obtained, the tool 2 is removed, i.e. moved along the same direction X but away from the tool (FIG. 5C).

Figure 6:
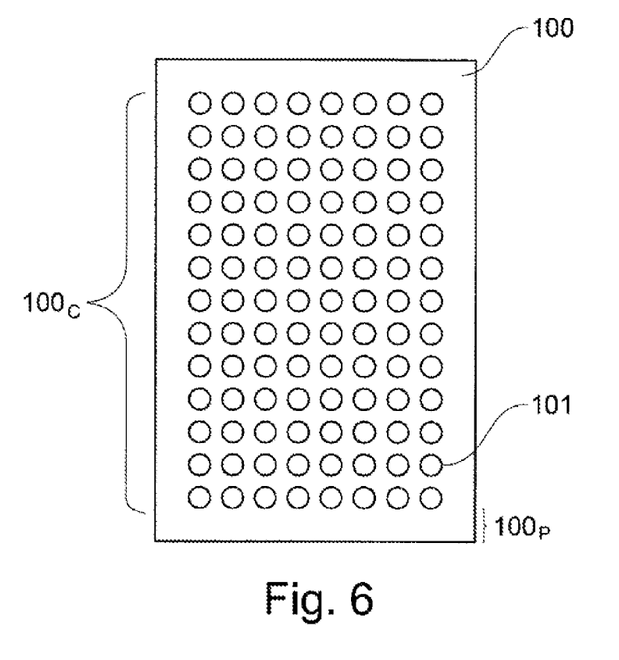
FIG. 6 is a schematic front view of a polymer band obtained using the process in FIGS. 5A to 5C.

An example of a polymer band 100 according to the invention is shown in FIG. 6: the band 100 is rectangular in shape and the holes 101, which are all identical to one another, are uniformly distributed over the central portion 100C of the band, the peripheral portion 100P of the latter being devoid of holes.

A metal paste is then deposited on one face 10.1 of the band 100 using a screen-printing technique. This paste is advantageously made of aluminum and the deposition allows the holes 101 to be at least partially filled with this paste. The same thing is done on the other face 10.2 with a paste of the same composition using the same screen-printing technique.

Figure 7:
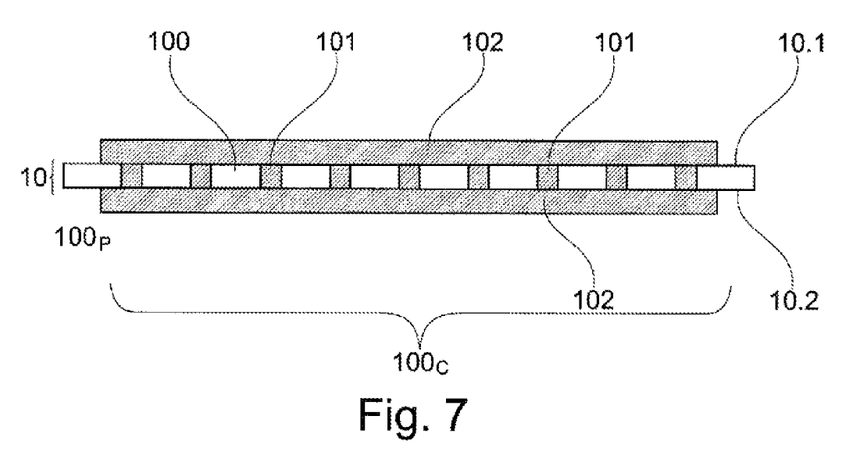
FIG. 7 is a cross-sectional view of a device according to the invention devoid of electrodes.

Thus the carrier portion forming the current collector of a device according to the invention is obtained with the two metal layers 102 deposited on each of the two faces 10.1, 10.2 of the band 100, a perfect metal and therefore electrical continuity being obtained by virtue of the holes 101 at least partially filled with the metal, a metal such as aluminum (FIG. 7).

By virtue of the peripheral portion 100P of the polymer band 100 that is devoid of metal, there is no risk of short-circuiting subsequently during operation, i.e. when a current is made to flow through a bipolar battery incorporating devices according to the invention.

As indicated above, the size and density of the holes and the amount of metal in the layers and holes is determined beforehand in order to minimize both the internal electrical resistance and the Joule heating that is liable to occur during operation.

To produce a complete bipolar battery according to invention, the procedure is as follows.

First, the carrier portion 10 of the device according to the invention, obtained such as above (FIG. 8A), is produced, i.e. a hybrid semi-product comprising a functional leak-tight sealing zone 100/current collector 102 the metal of which is filled into the holes 101 of the polymer band.

At least one electrode made of a lithium insertion material is then deposited in order to obtain, finally, the device according to the invention.

Such as illustrated in FIG. 8B, to produce a complete bipolar battery, three separate devices according to the invention are produced:

to obtain a "bipolar" device 1, a layer 12 of negative lithium insertion material (anode), such as a layer of $Li_4Ti_5O_{12}$, is deposited on a metal layer 102 forming the collector, and a layer 11 of a positive lithium insertion material (cathode), such as a layer of $LiFePO_4$, is deposited on the other metal layer forming the collector;

to obtain a positive "monopolar" device 1' only one layer 11' of positive lithium insertion material (cathode), such as a layer of $LiFePO_4$, is deposited on the only metal layer 102 deposited on the band 10; and to obtain a negative "monopolar" device 1" only one layer 12" of negative lithium insertion material (anode), such as a layer of $Li_4Ti_5O_{12}$, is deposited on the only metal layer 102 deposited on the band 10.

For these three devices 1, 1', 1", the electrode layers are advantageously produced by a printing technique (rotogravure, flexographic or screen printing) on the current-collecting portion 102 itself taking the form of one or more layers filling the holes 101, the periphery 100P of the polymer band 100 methodically being left devoid of any electrode. All the electrode layers 11, 12, 11', 12' and current collectors 102 are substantially the same size, as are all the peripheral zones 100P of the polymer bands.

Optionally, provision may be made for a calendering step in order to ensure a better electronic percolation in each electrode.

The devices 1, 1', 1" are then aligned and stacked with the bipolar device 1 between the two monopolar devices 1', 1", and separated by an electrically insulating and ionically conductive membrane 3 forming a separator: such as illustrated in FIG. 8C, a bipolar battery is then obtained that comprises two electrochemical cells C1, C2 that are stacked one on the other, and a peripheral zone 100P that is continuous over the entire height.

Once the stack has been produced, each separator is impregnated with an electrolyte. Alternatively, each separator may already have been impregnated with electrolyte during its placement in the stack.

To produce the definitive leak-tight seal between the compartments of such a bipolar battery, the peripheries 100P of the three bands 100 of the devices 1, 1', 1" are pressed against one another and the three bands are maintained pressed against one another. Thus, a wall that is leak-tight to the electrolytes 3 of the two cells C1, C2 and that surrounds the latter is produced over the entire height of the stack. Two alternative ways of carrying out this definitive sealing step may be envisioned:

either pressure is applied to the periphery 100P of the polymer band 100 of the cells, advantageously using the rigid packaging 4 of the battery (FIG. 8D);

or the polymer peripheries 100P are heat sealed, uniformly over the height, advantageously using a U-shaped clamp 5 (FIG. 8D').

Other variants and improvements of the invention described above may be envisioned without however departing from the scope of the invention.

Thus, for example, it may be envisioned to deposit each metal layer using a paste deposited by screen printing through a mask in order to allow the distribution of the paste to be localized.

Furthermore, instead of screen printing it may be envisioned to use rotogravure or flexographic printing to carry out the deposition.

Moreover, the polymer of the peripheral part 100P of the band 100 may be thicker than the polymer of the rest of the band in order to allow, during the heat sealing, a calibrated thickness to be preserved.

The invention claimed is:

1. A bipolar battery comprising at least two electrochemical cells stacked on one another and at least one device comprising:
   a band made of an electrically insulating material comprising at least one polymer; and
   at least one metal layer forming a current collector, said metal layer being deposited on each of two main faces in a central portion of the band;
   wherein:
   the central portion of the band comprises a plurality of holes opening onto two opposite main faces;
   the holes are filled at least partially with a metal that is continuous with each deposited metal layer;
   the whole periphery of the main faces of the band is devoid of the at least one metal layer and forms a frame of width sufficient to serve as a part of an electrolyte-tight wall in the electrochemical generator;
   the at least one metal layer is covered with an electrode made of a lithium insertion material; and
   one of the two layers forming the current collector is covered with the anode made of a lithium insertion material of one of the two cells, and the other of the two layers forming the current collector is covered with the cathode made of a lithium insertion material of the other of the two cells, the periphery of the band made of at least one polymer forming a peripheral zone of a wall that is leak-tight to the electrolytes of the two cells that encircles the latter.

2. The bipolar battery as claimed in claim 1, further comprising at least one device wherein the dimensions of the holes are determined to minimize internal resistance induced by the metal that fills it, and with the other face not covered by an electrode making contact via the holes filled with metal with a terminal current collector.

3. The bipolar battery as claimed in claim 1, wherein the at least one polymer of the band that is a majority constituent of the band is a polyolefin.

4. The bipolar battery as claimed in claim 1, wherein the at least one polymer that is a majority constituent of the band is a two-component resin.

5. The bipolar battery as claimed in claim 4, wherein the resin is an acrylic resin.

6. The bipolar battery as claimed in claim 1, wherein the holes are of cylindrical section.

7. The bipolar battery as claimed in claim 1, wherein the holes are of frustoconical section.

8. The bipolar battery as claimed in claim 1, wherein the diameter of the holes is between 50 and 500 μm.

9. The bipolar battery as claimed in claim 8, wherein the diameter of the holes is between 50 and 200 μm.

10. The bipolar battery as claimed in claim 1, wherein the density of the holes is equal to a number between 0.1 and 1/cm$^2$ of band.

11. The bipolar battery as claimed in claim 10, wherein the density of the holes is equal to a number between 0.1 and 0.3/cm$^2$ of band.

* * * * *